United States Patent [19]

Mileo et al.

[11] Patent Number: 5,670,123
[45] Date of Patent: Sep. 23, 1997

[54] PROCESS FOR THE EXTRACTION OF HYDROGEN SULPHIDE FROM A GAS MIXTURE

[75] Inventors: Jean-Claude Mileo, Saint Ismier; Christian Busson, Charbonniere; Claude Dezael, Maisons Laffitte; Jean-Charles Viltard, Valence; Christophe Berat, Ecully, all of France

[73] Assignee: Institut Francais Du Petrole, Rueil Malmaison, France

[21] Appl. No.: 523,151

[22] Filed: Sep. 5, 1995

[30] Foreign Application Priority Data

Sep. 2, 1994 [FR] France ................... 94 10637

[51] Int. Cl.$^6$ ................................. B01D 53/52
[52] U.S. Cl. ............... 423/220; 423/573.1; 423/576.4; 423/576.5
[58] Field of Search .................... 423/220, 573.1, 423/576.4, 576.5

[56] References Cited

U.S. PATENT DOCUMENTS

| | | | |
|---|---|---|---|
| 3,761,569 | 9/1973 | Heiba et al. | 423/224 |
| 4,192,854 | 3/1980 | Harvey et al. | 423/220 |
| 5,147,620 | 9/1992 | Rozsa | 423/224 |

FOREIGN PATENT DOCUMENTS

| | | | |
|---|---|---|---|
| 350591 | 10/1919 | Germany. | |
| 402624 | 3/1922 | Germany | 423/220 |
| 28 19 130 | 11/1978 | Germany. | |
| 5532733 | 3/1980 | Japan | 423/574.1 |
| 1194930 | 8/1989 | Japan | 423/576.5 |
| 802284 | 10/1958 | United Kingdom | 423/220 |

OTHER PUBLICATIONS

English Translation of German Patent Document No. DE-Alt PS 350,591, published 23 Mar. 1922.

*Primary Examiner*—Gary P. Straub
*Assistant Examiner*—Timothy C. Vanoy
*Attorney, Agent, or Firm*—Millen, White, Zelano & Branigan, P.C.

[57] ABSTRACT

A process for the extraction of hydrogen sulphide from a gas mixture comprises: a step (a) in which the gas mixture is passed into an aqueous acidic solution of copper sulphate under conditions which lead to the formation of copper sulphide; a gas which is highly depleted in hydrogen sulphide and an aqueous phase containing copper sulphide in suspension are recovered; a step (b) in which the copper sulphide contained in suspension in the aqueous phase from step (a) is oxidised using an oxygen-containing gas under conditions which lead to the formation of solid elemental sulphur and soluble copper sulphate from this liquid phase; and a step (c) in which the solid sulphur and the solid copper sulphide which is not transformed during step (b) are separated and at least a portion of the aqueous acidic phase containing the copper sulphate formed during step (b) is optionally recycled to step (a).

The process is used to absorb hydrogen sulphide contained in a variety of industrial gases.

9 Claims, No Drawings

PROCESS FOR THE EXTRACTION OF HYDROGEN SULPHIDE FROM A GAS MIXTURE

SUMMARY OF THE INVENTION

The present invention concerns a selective extraction process for hydrogen sulphide contained in a gas mixture. In a subsequent step, this process can recover sulphur in its elemental form in the solid state.

The prior art is illustrated by U.S. Pat. No. 5,147,620.

The process of the present invention is particularly suitable for a purification cycle for a gas mixture in which an aqueous absorbing solution is brought into contact with this gas mixture in a purification stage, and the hydrogen sulphide contained in the gas mixture is eliminated by fixing it in the form of a sulphur compound. In a subsequent stage, the regeneration stage, the product obtained after the purification stage is brought into contact with an oxygen-containing gas under conditions leading to transformation of the sulphur compound, formed by absorption during the purification stage, to elemental sulphur in the solid state.

The solid elemental sulphur can then be extracted by oxidation from the solution in which it is formed and the solution can be recycled to the gas mixture purification stage.

In its general form, the process of the present invention is a process for the extraction of hydrogen sulphide from a gas mixture, comprising:

a step (a) in which said gas mixture is passed into an aqueous acidic solution of copper sulphate under conditions which lead to the formation of copper sulphide, and a gas which is highly depleted in hydrogen sulphide and an aqueous phase containing copper sulphide in suspension are recovered, a step (b) in which the copper sulphide contained in suspension in the aqueous phase from step (a) is oxidised using an oxygen-containing gas under conditions which lead to the formation of solid elemental sulphur and soluble copper sulphate from this liquid phase, and a step (c) in which the solid sulphur and the solid copper sulphide which is not transformed during step (b) are separated and at least a portion of the aqueous acidic phase containing the copper sulphate formed during step (b) is optionally recycled to step (a).

Gas mixtures which can be treated using the process of the present invention may have a wide range of hydrogen sulphide concentrations, from several tens of parts per million (ppm) to several per cent by weight, or even several tens of per cents by weight.

The separation of the solids from the liquid phase during step (c) can be carried out using any method known to the skilled person, for example filtration or centrifuging. The aqueous acidic liquid phase is then easily recycled to step (a) of the process of the invention, at least in part and preferably completely.

The process of the invention may comprise a step (d) following step (c), during which the solid sulphur is separated from the copper sulphide which is not transformed in step (b), the copper sulphide being recycled to step (b) and the sulphur being recovered. Separation can be carried out, for example, by extraction with a selective solvent which dissolves the sulphur without dissolving the copper sulphide. It can also be carried out by melting the sulphur followed by filtration or distillation. The residual copper sulphide obtained can be recycled to the oxidation reactor at step (b).

One of the advantages of the process of the present invention, in contrast to a certain processes of the prior art using chemical absorption by aqueous solutions of amines or solutions of alkaline salts, is to use a compound which is completely inert towards carbon dioxide, which gas is often present in gas mixtures for purification which contain hydrogen sulphide.

The process of the present invention can thus be used to treat a gas mixture containing hydrogen sulphide selected from the group formed by natural gas, tail gases from the Claus process and residual gases from any chemical, biochemical or petrochemical processes.

When purifying the tail gases from the Claus process, they are normally subjected to a catalytic hydrogenation step before being sent to step (a) of the process of the invention. The process of the present invention is particularly suitable for the treatment of natural gas.

The ability of hydrogen sulphide to precipitate a number of heavy metals from an aqueous solution has been used for generations in analytical chemistry. Copper sulphate is chosen because of its known good solubility in water. This choice is also guided by the fact that the formation and precipitation of copper sulphide from hydrogen sulphide is practically instantaneous once the hydrogen sulphide comes into contact with the copper sulphate solution; above all, this precipitation is quantitative. In addition, a further important advantage of this choice resides in the fact that the copper sulphide formed is practically insoluble in the aqueous phase even at low pH. The solubility product of copper sulphide in water at 25° C. is $9 \times 10^{-36}$. Finally, a further important reason for this choice is the possibility of oxidising the copper sulphide formed to elemental sulphur which can then be readily eliminated.

The process described in U.S. Pat. No. 4,192,854 concerns the elimination of hydrogen sulphide from gases containing hydrogen sulphide and ammonia, in particular geothermal gases. According to this patent, the hydrogen sulphide is eliminated by contacting the gas mixture with an absorbing solution of copper sulphate, whose pH is buffered by ammonium sulphate, then oxidising the copper sulphide to copper sulphate using an oxygen-containing gas, the overall effect of which is to form sulphuric acid. This process does not produce elemental sulphur. However, in order to deal with surplus production exceeding demand, sulphur should preferably be produced in a form which is suitable for long term storage, i.e., in its elemental form and preferably as a solid, except where a sufficient capacity exists nearby to absorb the production. The new technologies of extractive hydrometallurgy aim for this since sulphates or dilute sulphuric acid have only a limited use and cannot be considered to be suitable for permanent storage.

The addition of copper sulphate to ferric salts is also known and described in German patent application DE-2, 189,130. In this document, a temperature of more than 120° C. is used, which temperature corresponds to the melting point of sulphur, at a relatively low acid concentration, and the ferric salts are those which directly oxidise the hydrogen sulphide. Under these conditions, the oxidation of copper sulphide is not favorable to the formation of elemental sulphur but rather tends to form copper sulphate.

We have surprisingly discovered that it is possible to form copper sulphide by reacting the feed in accordance with the invention with copper sulphate and with sulphuric acid, then to transform most of the copper sulphide to solid elemental sulphur by oxidation with a gas at a temperature of less than 120° C., usually much less than this temperature. This provides a process which is easy to carry out and more economical. We have also discovered that, by working at a high concentration of sulphuric acid in both the absorption step and the oxidation step, it is possible to obtain a selectivity to elemental sulphur, expressed with respect to the number of moles of sulphur isolated to the number of moles of copper sulphide consumed during the oxidation step, of at least 70%, preferably at least 90% and possibly 98%.

In a preferred embodiment of the present invention, a high concentration of sulphuric acid is used both during the hydrogen sulphide absorption step and during the copper sulphide oxidation step. Thus the aqueous acidic copper sulphate solution used in step (a) contains about 1 to about 8 moles per liter of sulphuric acid, advantageously about 1.5 to about 6 moles per liter of sulphuric acid and normally 2 to 4 moles per liter.

The reactions which take place during the process of the invention are as follows:

In absorption step (a): $H_2S + CuSO_4 \rightarrow CuS + H_2SO_4$
In oxidation step (b): $CuS + H_2SO_4 \rightarrow S_0 + CuSO_4 + H_2O$ The operating conditions of the process are preferably selected so as to maximally limit secondary reactions leading to the formation of sulphuric acid by re-oxidation of the sulphur and to the direct formation of copper sulphate by direct oxidation of copper sulphide. Formation of copper sulphide can be effected either at room temperature, or at the temperature used for the oxidation phase, or at any other temperature.

The copper sulphide oxidation step (b) is generally carried out using the suspension from step (a) containing about 1 to about 8 moles per liter of sulphuric acid, at a temperature of about 10° C. to about 119° C. and at a partial pressure of oxygen of about 0.01 to about 12 MPa. Advantageously, this oxidation is carried out using the suspension from step (a) containing about 1.5 to about 6 moles per liter of sulphuric acid, at a temperature of about 40° C. to about 95° C. and at a partial pressure of oxygen of about 0.1 to about 4 MPa. In a preferred embodiment of the invention, the oxidation temperature is about 45° C. to about 90° C. at a partial pressure of oxygen of about 0.2 to about 2.5 MPa and the suspension contains 2 to 4 moles per liter of sulphuric acid.

The concentration of the copper sulphate solution can vary between wide limits depending on the quantity of hydrogen sulphide to be absorbed. It is nevertheless desirable that the concentration of the copper sulphide suspension preferably does not exceed 15% by weight of the sulphide per liter of solution. This concentration is usually about 2% to about 10% by weight of sulphide per liter of solution. By way of non limiting example, the concentration of copper sulphate selected can be about 0.12 to about 0.4 moles per liter.

An oxidation catalyst may be used during the oxidation step. It has been observed, however, that under optimal conditions of temperature, partial pressure of oxygen and acidity for carrying out the oxidation step described above, the presence of these catalysts influences neither selectivity towards the formation of solid elemental sulphur, nor the oxidation kinetics and hence the conversion rate. Beyond these optimal conditions of temperature, partial pressure of oxygen and acidity for carrying out the oxidation step described above, the presence of these catalysts has no effect on the selectivity towards formation of solid elemental sulphur, but may improve the conversion rate. An example of an oxidation catalyst is a conventional catalyst containing transition metal salts such as metals from groups VIB, VIIB and VIII of the periodic classification of the elements (Handbook of Chemistry and Physics, 72nd edition, inside front cover, CAS version).

EXAMPLES

The following examples illustrate the invention without limiting its scope.

Example 1

An absorbing solution was prepared by dissolving copper sulphate pentahydrate in an aqueous sulphuric acid solution. The prepared solution contained 100 grams per liter (g/l) of copper sulphate $CuSO_4$, $5H_2O$, and 490 g/l of sulphuric acid $H_2SO_4$ (5 moles per liter).

A gas mixture containing 96% by volume of nitrogen and 4% by volume of hydrogen sulphide was introduced into this solution at a pressure of 0.35 MPa, at a flow rate which corresponded to the introduction of 1.6 liters of hydrogen sulphide per hour for a time sufficient to consume two thirds of the copper sulphate. During this step, a gas was recovered which was highly depleted in hydrogen sulphide which contained no more than 2 ppm of hydrogen sulphide.

The copper sulphide suspension obtained was oxidised at a temperature of 48° C. at a partial pressure of oxygen of 0.52 MPa. The copper sulphide conversion ratio, expressed as the ratio of the number of moles of copper sulphide consumed over the number of moles of copper sulphide precipitated, was 60% and the selectivity towards sulphur, expressed as described above, was 92%.

When carried out at the same pressure and at a temperature of 60° C., the oxidation step produced a copper sulphide conversion ratio of 91% and a selectivity towards elemental sulphur of 87%.

Example 2

Example 1 was repeated using the same conditions, except that the concentration of the absorption solution of $CuSO_4.5H_2O$ was 100 g/l and that of the $H_2SO_4$ in this solution was 245 g/l. The oxidation step was carried out under the same conditions as those described for Example 1 except that the temperature was 60° C. In this case, the copper sulphide conversion ratio was 86% and the selectivity towards sulphur was 90%.

Example 3

Example 2 was repeated using the same conditions for both the absorption step and for the oxidation step, but the temperature was 80° C. In this case, the copper sulphide conversion ratio was 96% and the selectivity towards sulphur was 95%.

Example 4

Example 2 was repeated using the same conditions for both the absorption step and for the oxidation step, but the temperature was 104° C. In this case, the copper sulphide conversion ratio was 90% and the selectivity towards sulphur was 76%.

Example 5 (comparative)

Example 4 was repeated using the same conditions, but with an initial acidity of the absorbing solution of 49 g/l of sulphuric acid (0.5 moles per liter). Oxidation produced a copper sulphide conversion ratio of 96% but a selectivity towards elemental sulphur of 30%.

These examples show the influence of the sulphuric acid concentration on the selectivity of the reaction leading to the formation of the elemental sulphur.

We claim:

1. A process for the extraction of hydrogen sulphide from a gas mixture comprising:

(a) passing said gas mixture into an aqueous acidic solution of copper sulphate containing about 1 to about 8 moles per liter of sulphuric acid under conditions which lead to the formation of copper sulphide, recovering a gas which is depleted in hydrogen sulphide and an aqueous phase containing copper sulphide in suspension, (b) oxidizing the copper sulphide contained in suspension in the aqueous phase from (a) with an oxygen-containing gas at a partial pressure of oxygen of 0.1 to 4 MPa under conditions which lead to the formation of at least 70% solid elemental sulphur expressed with respect to the number of moles of sulphur isolated to the number of moles of copper sulphide consumed during this oxidation step and soluble copper sulphate from said aqueous phase, and (c) separating the solid sulphur and solid copper sulphide not transformed during (b) and optionally recycling at least a portion of the aqueous phase containing copper sulphate formed during (b) to (a).

2. A process according to claim 1, in which the aqueous acidic copper sulphate solution used in (a) contains about 1.5 to about 6 moles per liter of sulphuric acid.

3. A process according to 2, in which the oxidation of the copper sulphide during (b) is carried out at a temperature of about 40° C. to about 95° C.

4. A process according to claim 1, in which oxidation of the copper sulphide during (b) is carried out at a temperature of about 10° C. to about 119° C.

5. A process according to 4, in which the oxidation of the copper sulphide during (b) is carried out using the suspension from (a) containing about 1.5 to about 6 moles per liter of sulphuric acid and at a temperature of about 40° C. to about 95° C.

6. A process according to claim 1, in which the oxidation of the copper sulphide during (b) is carried out at a temperature of about 40° C. to about 95° C.

7. A process according to claim 1, further comprising a step (d) after (c) during which the solid sulphur is separated from the solid copper sulphide which has not been transformed during (b), further comprising after recycling the copper sulphide to (b) and recovering the sulphur.

8. A process according to claim 1, wherein the gas mixture containing hydrogen sulphide is natural gas, a tail gas from the Claus process or residual gas from any chemical, biochemical or petrochemical process.

9. A process according to claim 1, further comprising (d) after (c), wherein the copper sulphide of (c) is recycled back to (b).

* * * * *